United States Patent [19]

Häusler et al.

[11] 3,839,092

[45] Oct. 1, 1974

[54] ELECTRO-CHEMICAL, GASPROOF BUTTON CELL

[75] Inventors: Ernst Häusler; Manfred Stommel, both of Duisburg, Germany

[73] Assignee: Yardney International Corporation, Los Angeles, Calif.

[22] Filed: Apr. 2, 1973

[21] Appl. No.: 347,111

[52] U.S. Cl. ............... 136/111, 136/90, 136/114
[51] Int. Cl. ........................................ H01m 21/00
[58] Field of Search .................... 136/111–114, 136/90, 159–162, 166, 175

[56] References Cited
UNITED STATES PATENTS

| | | | |
|---|---|---|---|
| 2,843,650 | 7/1958 | Jacquier | 136/111 |
| 2,852,592 | 9/1958 | Salauze | 136/90 |
| 3,375,142 | 3/1968 | Concannon | 136/90 |

*Primary Examiner*—Anthony Skapars
*Attorney, Agent, or Firm*—Donald E. Nist

[57] ABSTRACT

The present invention relates to an electrochemical, leakproof button cell comprising a metal cell pan and a metal cover bearing an insulating layer in gasproof relation on the rim thereof, a pair of electrodes with an interposed separator, an electrolyte container and activator, one electrode being electrically connected to the cell pan and the other electrode electrically connected to the cell cover. Such button cell, after dry storage, can be easily activated by filling with an electrolyte from said container.

10 Claims, 1 Drawing Figure

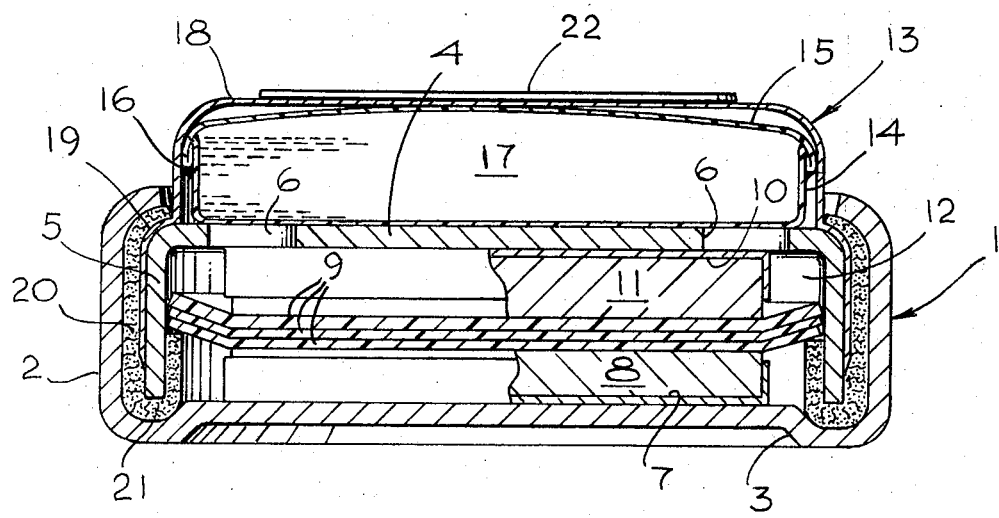

ELECTRO-CHEMICAL, GASPROOF BUTTON CELL

BACKGROUND

1. Field of the Invention

The present invention generally relates to electrochemical cells and, more particularly, to those of the gasproof button cell type.

2. Prior Art

With known gasproof button cells the electrolyte is stored from the outset inside the housing of the cell. This has the disadvantage that the cells are activated during assembly, and they therefore have a limited storage time. In this regard, once they are activated, they age, i.e., discharge more or less fast even though no current is taken out, as a result of external influences such as temperature, etc.

On the other hand, batteries with storage cells are known that have precharged, dry electrodes which after storage are activated by filling in the electrolyte. Two systems are known for the activation of such batteries. In the one system the electrode pairs are arranged as a pack or stack in a common battery housing which is furnished with a central electrolyte chamber whose content at activation is fed into the battery housing. Feeding the electrolyte can also be brought about by a central filling device whereby the corresponding ducts for introduction of the electrolyte into the battery housing will be furnished additionally.

Such configurations have the disadvantage that the cells, due to their common electrolyte ducts, create an electrolytic shunt field which over a period of time leads to capacity losses and overheating of the cell. In order to avoid this, the second known type of activation system provides that each single cell in the battery block has its own electrolyte container which is activated from a central gas tank or gas cartridge. For this purpose, a special electrolyte tank is provided for each cell in the battery housing which tank connects via an electrolyte duct system with each single cell. Such a design, however, requires cumbersome construction with need for much space and is therefore built only for special applications.

For dry cells (Leclanché cells) of an older type it has also been proposed for dry storage purposes to arrange the electrolyte in a movable container within the housing; when the activation is to take place, the container is pressed against a horn of the carbon rod in the cell and thereby is smashed to release the electrolyte. Configurations with a flexible housing bottom are known in this context.

All known designs for precharged, dry storage cells or dry elements are, however, not suitable for gasproof button cells which on account of their size and gasproof construction generally have been considered unsuitable for activation after assembly.

SUMMARY OF THE INVENTION

The foregoing problems have been overcome by the cell of the present invention. The present cell is substantially as set forth in the abstract above. Such cell is gasproof and can easily be activated after storage. Precharged, dry electrodes are arranged in the body of the button cell shielded with a cell lid that has openings, i.e., slits and/or perforations so as to provide access thereto by a liquid. Above the lid a container is provided which is filled with electrolyte and made of plastic or metal sheet or the like. This container is capped by a membrane lid extending over the rim of the cell head.

This new type button cell with precharged, dry electrodes can be stored advantageously for a long time and may be activated directly prior to use. The activation procedure comprises merely pushing in the membrane lid, whereupon the electrolyte container bursts and the electrolyte is forced into the electrode chamber of the button cell through the perforations in the lid thereof. The electrolyte takes over its electrochemical task upon contacting the electrodes. Such a button cell is of very simple design, retaining the usual assembly pattern of a button cell. Another advantage is the fact that the button cell can not only be used as a single cell but also can be used in multicell batteries employing means, such as a central pressure generator for activating all cells in the battery. Means of pressure production may differ. There exists, for example, the possibility for mechanical means which exert sufficient pressure on several button cells stacked side-by-side or superimposed, to cause the membrane lids of each button cell to be pushed inward, rupturing the electrolyte containers. Furthermore, there exists the possibility to exert pressure by pneumatic or hydraulic means running through proper ducts in the battery housing to the membrane lid.

Preferably, the electrolyte container of the present cell comprises thin, weak plastic sheeting in a two-part construction, including a pan-like lower part and a welded-on top cover part. Such a pillow-shaped electrolyte container is especially suitable where the membrane lid is pressed in to burst. In order to localize the tear or burst, the plastic of the pan-shaped lower part can be made of lesser gauge, i.e., weaker at the bottom section.

The deformable membrane lid can be fabricated in any suitable manner and with any suitable materials, for example, metal sheet or the like. This material not only makes possible the pressing in of the membrane lid for the purpose of crushing the electrolyte container positioned below it, but serves simultaneously as an electric pole, being connected conductively via the cell lid with the upper (usually negative) electrode. To facilitate even pressing exerted by the membrane lid, various designs are suitable. Preferably, the membrane lid is strengthened at its upper surface, for example, by placing a pan-shaped reinforcement plate at that point or a ring-shaped corrugated reinforcement. In order to further facilitate uniform pressing by the membrane lid's upper surface, the protruding rim of this lid may be provided with a recess or it may be bellow-like shape. To avoid a tearing of the membrane lid at its edge, it is also possible to furnish it with a supporting ring which also helps to retain the cell even after the pressing has begun.

To further preserve the tight seal on the button cell, the cell lid sidewall and the membrane lid are mated to each other and extend down into the pocket of a sealing gasket the exterior of which tightly engages the pan wall. Preferably, the seal is placed into a ring-shaped groove of the cell pan, thus ensuring a safe seal.

Further advantages of the invention are set forth in the following detailed description and the accompanying drawing.

DRAWING

The single FIGURE in partial vertical section, with portions broken away, depicts a preferred embodiment of the button cell of the invention.

DETAILED DESCRIPTION

The gasproof button cell depicted in the single FIGURE comprises a metallic cell pan 1, a metal cell lid 4, positive and negative electrodes 8 and 11, separator 9, an electrolyte container 13 and a metallic membrane lid 18. As may be seen from the single FIGURE, a small pan 7 is placed in the cell pan for locating the positive electrode therein. Under the cell lid 4 there is likewise a small pan 10 fastened for receiving the negative electrode 11.

The positive electrode comprises a precharged, dry positive electrode mass, as for example, silver-I-oxide or silver-II-oxide, silver chloride, copper oxide, copper chloride or lead superoxide. The negative electrode 11 however may consist of zinc, lead or magnesium. In the assembled state, the cell lid 4 with the lid wall 5 engages the cell pan at the point where the gasket 20 is provided, the lower rim of the lid wall being disposed in pocket 21. The pan wall is designated in the single FIGURE. The cell pan 1 is furnished with a ring-shaped bottom groove 3 to accommodate the lower edge of the ring-shaped seal.

The cell lid 4 has slits 6 radially arranged in its upper range. These slits 6 are open toward the free ring space 12 next to the electrodes 8 and 11.

An electrolyte container 13 is placed above the cell lid 4. It comprises a pan-shaped lower part 14 and a cover part 15, both made of thin frangible sheet, either plastic or metal. In the assembly of container 13, the pan-shaped lower part 14 is first filled with electrolyte 17 and then the cover part 15 is welded to it along the cojoined rim. The welded edge is designatd 16 in the drawing.

The membrane lid 18 which overlaps the electrolyte container 13 constitutes the upper covering of the button cell. The lid 18 projects like a hood over the rim of the cell pan 1. The membrane lid rim 19 rests upon the lid wall 5 of the cell lid 4, supporting itself with one shoulder and reaches downward approximately to the lid wall 5. In the drawing, the membrane lid 18 is shown with a disk-shaped reinforcement plate 22 concentrically arranged. The membrane lid 18 is made of thin, flexible metal sheet or a thin, flexible plastic material or the like.

In the assembled state, the membrane lid rim 19 and the cover wall 5 are embraced by the pan wall 2, whereby the membrane lid and cell cover are electrically insulated by the ring gasket 20 opposite the cell pan 1. The upper rim of pan wall 2 is flanged inward so that the button cell is sealed tight.

The described button cell, with precharged, dry electrodes 8 and 11, has a long shelf life. In order to activate the button cell, membrane lid 18 is pressed down. Reinforcement plate 22 in that lid promotes the distribution of uniform pressure downwardly. The pressing-down of the membrane lid bursts the electrolyte container 13, whereupon the electrolyte 17 flows through the slits 6 into the free ring space 12, next to the electrodes, from where it can flow to the active electrode surfaces for activation.

The present invention is not limited to the design shown; numerous changes are feasible. For example, the electrolyte container can be formed from a suitable metal sheeting which tears upon impact. The thickness of the material for such container will depend on the desired activation pressure. For example, the strength of such material can be selected such that strong finger pressure will be sufficient to press in the membrane lid and destroy the electrolyte container.

Alternatively, for those cells which are expected to be subject to special mechanical stress during storage, sheeting can be employed for the container such that a greater pressure is required to rupture the sheeting and effect activation. Moreover, the choice and shape of the membrane cover can be varied. In addition, its head area reinforcement may, for example, be brought about by ring-shaped stiffening seams. And it is also possible to furnish the overlapping rim of the cell pan over the protruding rim of the membrane lid with a recess or corrugation. Sharp buckling of the membrane lid where it protrudes may for instance, be avoided by appropriately positioning a support ring relative thereto. The button cell may also be constructed in various sizes and overall shapes while still having the described advantages.

Various other modifications can be made in the present cell, its components and parameters. All such modifications as are within the scope of the appended claims form part of the present invention.

What is claimed is:

1. An electrochemical gasproof button cell comprising a metal cell bottom pan and a metal cell cover defining openings and bearing insulative material and sealed in a tight manner to the edge of said bottom pan; a pair of precharged, dry electrodes with an interposed separator, one of said electrodes being conductively connected to said cell pan and the other of said electrodes being conductively connected to said cell cover, an easily breakable electrolyte container filled with an electrolyte disposed over said cell cover and a cap-shaped membrane lid disposed over said container and projecting down over the edge of said cell pan.

2. The button cell of claim 1, wherein said electrolyte container comprises fragile plastic material, including a pan-shaped lower part and a cover welded thereto.

3. The button cell according to claim 2, wherein said plastic material of said pan-shaped lower part is less thick at its bottom area overlying said openings in said cell cover.

4. The button cell of claim 1, wherein said membrane lid comprises thin, flexible metal.

5. The button cell of claim 4, wherein said membrane lid is reinforced at its uppermost surface.

6. The button cell of claim 5, wherein ring-shaped stiffening seams are arranged on said uppermost surface.

7. The button cell of claim 1, wherein the edge of said membrane lid protruding beyond the edge of said cell pan includes a constrictive portion.

8. The button cell of claim 1, wherein a support ring is disposed against the inside edge of said cell pan and the protruding edge of said membrane lid.

9. The button cell of claim 1, wherein the wall of said cover and the overlying portion of said membrane lid are sandwiched together in a pocket formed in a ring gasket disposed against the sidewall of said pan.

10. The button cell of claim 9, wherein said ring gasket rests in an annular shaped groove within said bottom pan of said cell.

* * * * *